United States Patent [19]

Chennakeshu et al.

[11] Patent Number: 5,400,362

[45] Date of Patent: Mar. 21, 1995

[54] DOUBLE SIDED SLOT TRAVERSING DECODING FOR TIME DIVISION MULTIPLE ACCESS (TDMA) RADIO SYSTEMS

[75] Inventors: Sandeep Chennakeshu, Schenectady; Raymond L. Toy; Ravinder D. Koilpillai, both of Latham, all of N.Y.

[73] Assignee: General Electric Company, Schenectady, N.Y.

[21] Appl. No.: 39,599

[22] Filed: Mar. 29, 1993

[51] Int. Cl.[6] .............................. H04J 3/16; H04J 3/06
[52] U.S. Cl. ..................................... 375/58; 370/100.1; 370/95.3
[58] Field of Search ........................ 375/10, 94, 95, 99, 375/101, 75, 58; 328/162; 370/95.3, 100.1

[56] References Cited

U.S. PATENT DOCUMENTS

| | | | |
|---|---|---|---|
| 5,182,749 | 1/1993 | Kazecki et al. | 370/100.1 |
| 5,241,545 | 8/1993 | Kazecki et al. | 370/100.1 |
| 5,257,265 | 10/1993 | Su et al. | 370/100.1 |
| 5,335,250 | 8/1994 | Dent et al. | 375/10 |

OTHER PUBLICATIONS

Pp. 85–86 of Jan. '91 EIA/TIA "Interim Standard–Cellular System, Dual Mode Mobile Station–Base Station Compatibility Standard" Publication IS-54-A by the Electronics Industries Assoc., Engineering Dept.

"An Adaptive MLSE Receiver for TDMA Digital Mobile Radio", by R. D'Avella, et al, IEEE Journal on Selected Areas in Communications, vol. 7, No. 1, Jan. 1989, pp. 122–129.

"A Power–Spectral Theory of Propagation in the Mobile–Radio Environment" by M. J. Gans, IEEE Transactions on Vehicular Technology, vol. VT-21, No. 1, pp. 27–38, Feb. 1972.

"Sequential Coding Algorithms: A Survey and Cost Analysis" by John B. Anderson and Seshadri Mohan.

*Primary Examiner*—Stephen Chin
*Assistant Examiner*—Duane Kobayashi
*Attorney, Agent, or Firm*—Lawrence P. Zale; Marvin Snyder

[57] ABSTRACT

A digital time division multiple access (TDMA) radio communications system employs a digital information source for providing digital information, a transmitter for transmitting encoded digital information in a radio-frequency (RF) signal to a receiver which demodulates the encoded symbols into digital information to be utilized by an output device. The receiver, synchronizes, compensates for frequency drift, samples and divides the samples into halfslots of samples. The halfslots are subdivided into subslots numbered from 1 to N, where N represents the last received subslot. Subslots 1 and N are demodulated into digital information in a forward and reverse direction, respectively with metrics calculated. If the metrics indicate a signal with a larger signal-to-noise ratio from subslot N, subslot N−1 is demodulated in a reverse sense with another reverse metric calculated, and vice versa. This process of extending demodulation in the direction of greater signal strength is repeated until all subslots in the slot have been demodulated. A second embodiment passes through all subslots in a forward and reverse direction calculating subslot metrics. The subslot metrics are summed into a halfslot metrics. The best halfslot metric indicates the sense of demodulation of each subslot. The digital information is then dumped in the proper order and sense to an output device which utilizes the digital information resulting in increased performance during fade periods.

7 Claims, 4 Drawing Sheets fig. 1 fig. 2 fig. 3

DOUBLE SIDED SLOT TRAVERSING DECODING FOR TIME DIVISION MULTIPLE ACCESS (TDMA) RADIO SYSTEMS

CROSS REFERENCES TO RELATED APPLICATIONS

This application is related to U.S. patent application "Bi-directional Demodulation Method and Apparatus" Ser. No. 07/965,848 filed Oct. 22, 1992 ("Bi-directional Demodulation application") by Paul W. Dent and Sandeep Chennakeshu hereby incorporated by reference.

BACKGROUND OF THE INVENTION

1. Field of the Invention

This invention relates to digital radio systems and more specifically to transmitting, receiving and demodulating digital information in a Time Division Multiple Access (TDMA) radio system.

2. Description of Related Art

In time division multiple access (TDMA) radio systems, base units communicate with a plurality of mobile radio units. Each mobile radio is allocated a frequency channel and a time slot within that channel to communicate with the base unit. A transmitter of one of the communicating units transmits predetermined reference symbols embedded at periodic intervals in a continuous radio-frequency (RF) signal allowing a receiver to synchronize with these reference symbols and separate the RF signal into frames and time slots. The receiver searches for the reference symbols by comparing the received signal to an internal set of reference symbols. Typically, a mobile receiver disregards all information except the slot which is intended for it.

Channel impairments such as RF interferences, radio signal "fades" and other RF distortion may cause improper reception at the receiving unit even if the impairment is transient in nature.

The improper reception translates to an increased bit error rate (BER) in the decoded digital information. In addition to the above-mentioned impairments, the mobile radio receiver has to contend with radio signal reflected off of physical objects creating echoes known as multipath propagation. To combat multipath propagation problems, an equalizer is required in the radio receiver.

Conventional radio receivers decode a received RF signal by sampling the signal into a slot of samples and decoding the slot in a forward direction from the first received sample, the start of the slot to the last received sample, being from the end of the slot. This decoding is in a forward sense. Alternatively, the decoder may begin decoding at the end of the slot and works its way to the beginning of the slot, referred to as reverse decoding or decoding in a reverse sense. These schemes may be referred to as single sided decoding schemes since they decode in a single direction being either the forward or reverse sense. Single sided decoding schemes are prone to error propagation since errors in decoded samples are incorporated in calculations involving decoding of subsequent samples. Therefore, a single error at the beginning of a slot is propagated resulting in multiple errors over the slot. This is common in implementing automatic frequency control (AFC), timing recovery, channel estimation, etc.

The aforementioned Bi-directional Demodulation application by Paul W. Dent and Sandeep Chennakeshu describes a method of decoding a slot in a forward direction and a backward direction and choosing the direction which gives the best result. This does not require any additional reference information.

Currently there is a need for a system for demodulating TDMA information having greater fade resistance and superior performance than existing systems.

OBJECTS OF THE INVENTION

An object of the present invention is to provide a communication system for transmitting digital information with an improved BER over conventional mobile communications systems.

Another object of the invention is to provide a system of communication having increased performance relative to conventional systems by reducing error propagation.

Another object of the invention is to provide a communication system having superior resistance to short radio signal fades.

Another object of the invention is to provide a communication system employing a simplified mobile radio receiver requiring a lower complexity equalizer than conventional equalizers.

SUMMARY OF THE INVENTION

A digital communication system comprises a digital information source for providing data symbols to be transmitted, a transmitter for transmitting data symbols in a digital radio-frequency (RF) signal, a receiver and an output means.

The receiver employs an analog-to-digital (A/D) converter to sample the transmitted RF signal.

A synchronizer in the receiver estimates sample timing indicating the beginning and end of each slot and provides a plurality of slots of data corresponding to the transmitted data symbols. The slots are divided into two half-slots then each half slot subdivided into subslots numbered from 1 to N and provided to a subslot selection unit. A subslot selection means selects the first subslot from the beginning of the halfslot which have not been demodulated ("non-demodulated subslot") being subslot 1, and the first non-demodulated subslot from the end of the halfslot from the end of the halfslot being subslot N, and provides these subslots to a demodulator to be demodulated. The equalizer/demodulator demodulates subslot 1 in a forward direction or forward sense and subslot N in a reverse direction or reverse sense. A forward metric $F_{11}$, $F_{12}$, $F_{13}$, ... is computed for subslots 1, 2, 3, ... demodulated in the forward direction or forward sense, and a reverse metric $R_{1N}$, $R_{1N-1}$, $R_{1N-2}$, ... computed for subslots N, N−1, N−2 ... demodulated in a reverse direction or reverse sense, respectively. The metric employed is a measure of the inverse of the average signal-to-noise (SNR) ratio of a subslot. If the reverse metric $R_{1N}$ for subslot N indicates lower SNR than the forward metric $F_{11}$ for subslot 1, then the next subslot selected to be demodulated will be the next non-demodulated subslot measured from the beginning of the halfslot and is demodulated in a forward direction, otherwise the subslot selection means selects the next subslot to be demodulated will be the next non-demodulated subslot measured from end of the slot demodulated in a reverse direction. This process of choosing a subslot, decoding the subslot, calculating a metric, comparing it to the last metric calculated having the opposite sense (reverse vs. forward), and choosing a next non-demodulated subslot based upon a measure of SNR is repeated until all subslots in both halfslots have been demodulated. The demodulated digital information is arranged by a subslot construction means in the original order of their corresponding samples and provided to the output device capable of utilizing digital information. This entire process is then repeated for the other halfslot and successive slots.

A second embodiment demodulates a halfslot in a forward sense, and calculates metrics for each subslot, demodulates the same halfslot in a reverse direction calculating a reverse metric for each subslot, then determines N+1 slot metrics being combinations of forward metrics and reverse metrics. The forward and reverse metrics are once again chosen to reflect a measure of the average SNR over the subslot. The best slot metric then indicates which subslots are demodulated in a forward sense, and which are demodulated in a reverse sense. The demodulator selects digital information for each subslot demodulated in the proper sense as indicated by the best slot metric. The demodulated information is then placed in the proper order and sense and passed to an output device capable of utilizing the information.

Since the present invention is resistant to fades, the equalizer employed need not correct transmission errors to as great a degree as in conventional receivers, thereby allowing a less complex equalizer to be employed.

The system of the present invention is more robust, more resistant to channel impairments in demodulating digital information and exhibits reduced BER for a given transmission rate than existing communication systems.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE INVENTION

In a time division multiple access (TDMA) system, data from a digital information source is encoded as symbols in a transmitter and transmitted in a radio-frequency (RF) signal to a receiver which samples the received RF signal to provide a series of frames and time slots comprised of data samples. Each user is allotted one time slot to transmit data and receive data. Typically, a transmitter transmits a header or preamble of known reference symbols followed by data symbols in each time slot. The preamble or known reference symbols are used for functions such as synchronization, slot identification, addressing and estimating the channel. The frame and slot structure used in U.S. digital cellular TDMA system for transmission between base station and mobile station is illustrated in FIG. 1 and described on p. 85–86 of January '91 EIA/TIA "Interim Standard—Cellular System, Dual Mode Mobile Station—Base Station Compatibility Standard" Publication IS-54-A by the Electronics Industries Assoc., Engineering Dept.

Figure 1:
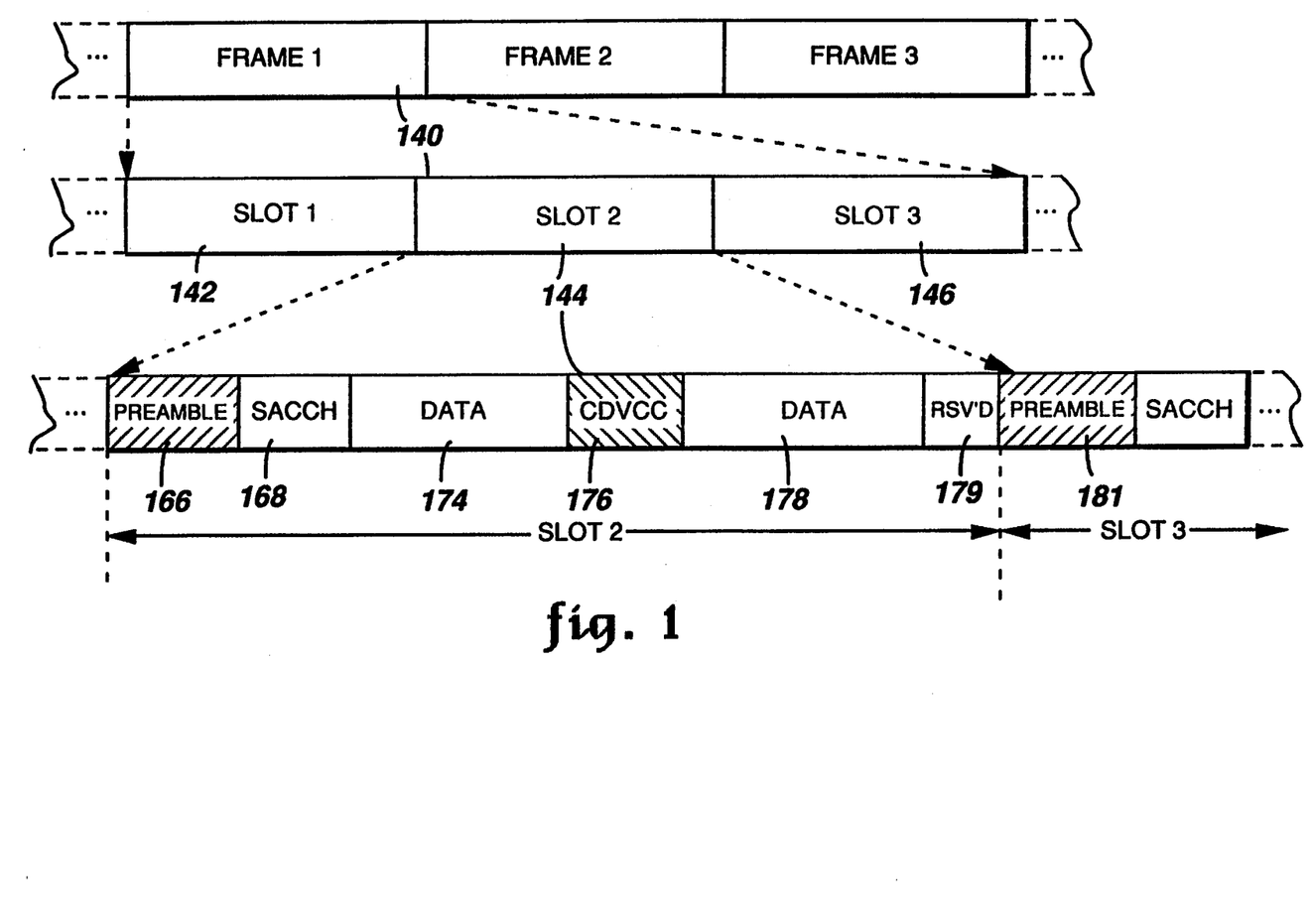
FIG. 1 is an illustration of frame/slot data format for U.S. digital cellular time division multiple access (TDMA) telephone systems.

FIG. 1 shows a continuous RF transmission signal which is sectioned into frames of data. Each frame, such as frame 140 is divided into three time slots or data slots, one of which is slot 2, 144 of FIG. 1. Even though the slot illustrated in FIG. 1 is U.S. digital cellular telephone communication format, the present invention applies equally to other formats for digital transmission, but the TDMA U.S. cellular telephone format was chosen for purposes of describing the invention. A U.S. digital cellular telephone communication slot is comprised of a preamble 166, a slow associated control channel (SACCH) block 168, the encoded data 174 and 178 (which may be encoded speech data), a coded digital verification color code (CDVCC) block of data 176 and a reserved block of data 179 described on p. 85–86 of January '91 EIA/TIA "Interim. Standard—Cellular System, Dual Mode Mobile Station—Base Station Compatibility Standard" Publication IS-54-A by the Electronics Industries Assoc., Engineering Dept.

After transmission of the RF signal to a receiver, an equalizer in the receiver minimizes errors incurred in transmission such as reflected echoes known as mulipath propagation and transients of a symbol signal which continue into another symbol period, known as intersymbol interference. The equalizer compares known symbols to received samples to determine a channel impulse response (CIR). Initially this is very straight-forward with stored reference symbols being the known symbols, being compared to the received reference samples. After the reference symbols are exhausted, however, other known symbols must be used. Previously demodulated samples are now used as the known symbols with the newly received samples being compared to them to determine the CIR. The equalizer requires an estimate of the CIR to begin demodulation of the signal, therefore the CIR estimate is always based upon the previously demodulated samples after the reference symbols have been demodulated as described in "An Adaptive MLSE Receiver for TDMA Digital Mobile Radio", by R. D'Avella, et al, IEEE Journal on Selected Areas in Communications, Vol. 7, No. 1, January 1989, pp. 122–129. The equalizer can make use of the known reference symbols such as preambles 166, 181, or CDVCC 176 to estimate the CIR. Errors occur in decoding when the channel conditions are poor, such as when the signal drops in strength for a short period of time known as a "fade". When decoding errors occur, they are fed into the CIR estimator which incorrectly estimates CIR values which in turn causes incorrect demodulation of subsequent samples producing more errors. This effect is known as error propagation.

Figure 2:
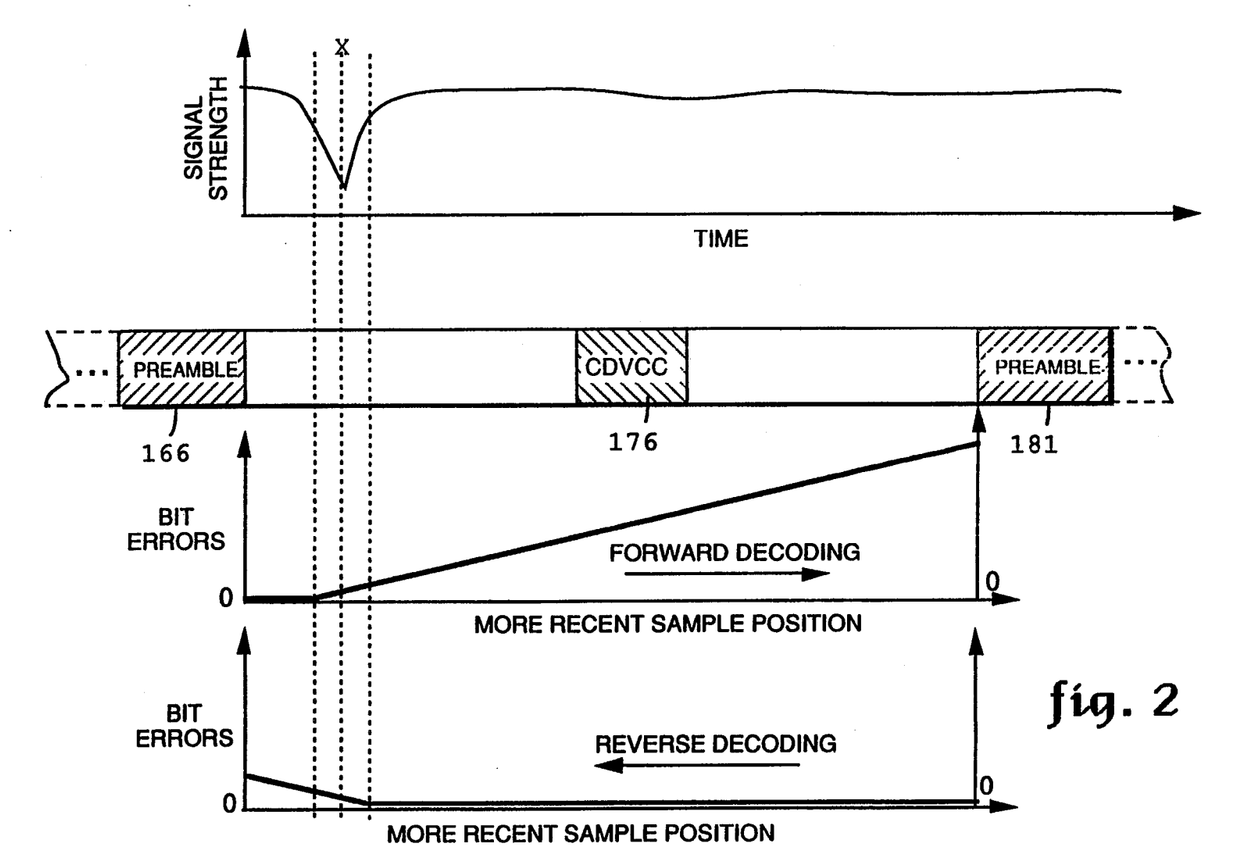
FIG. 2 is an illustration of the effect of a signal fade on the number of bit errors in demodulating a received RF signal.

FIG. 2 illustrates a fade in the received RF signal during a single data slot. The fade occurs at point X in the slot which is closer to the beginning of the slot. If the slot is being demodulated in a forward sense errors would begin to occur at point X. Due to error propagation, not only is there an error in demodulating the faded portion of the signal, but the demodulated information leads to incorrect CIR estimates and corrupts the process employed in demodulating subsequent samples. This results in numerous errors beginning at point X and continuing throughout the remainder of the slot. This will result in incorrect data from point X until the end of the slot.

However, if the slot were demodulated in a reverse sense starting from the end of the slot and working back to the beginning of the slot, the fade point X would not be encountered until most of the slot has been demodulated. Therefore, most of the slot would be demodulated correctly with errors beginning at point X and continuing in a reverse direction to the beginning of the slot resulting in a smaller portion of the demodulated data being incorrect. It therefore would be most beneficial to demodulate a slot in the forward and reverse directions and meet at the fade point X, thereby obtaining the best results.

Figure 3:
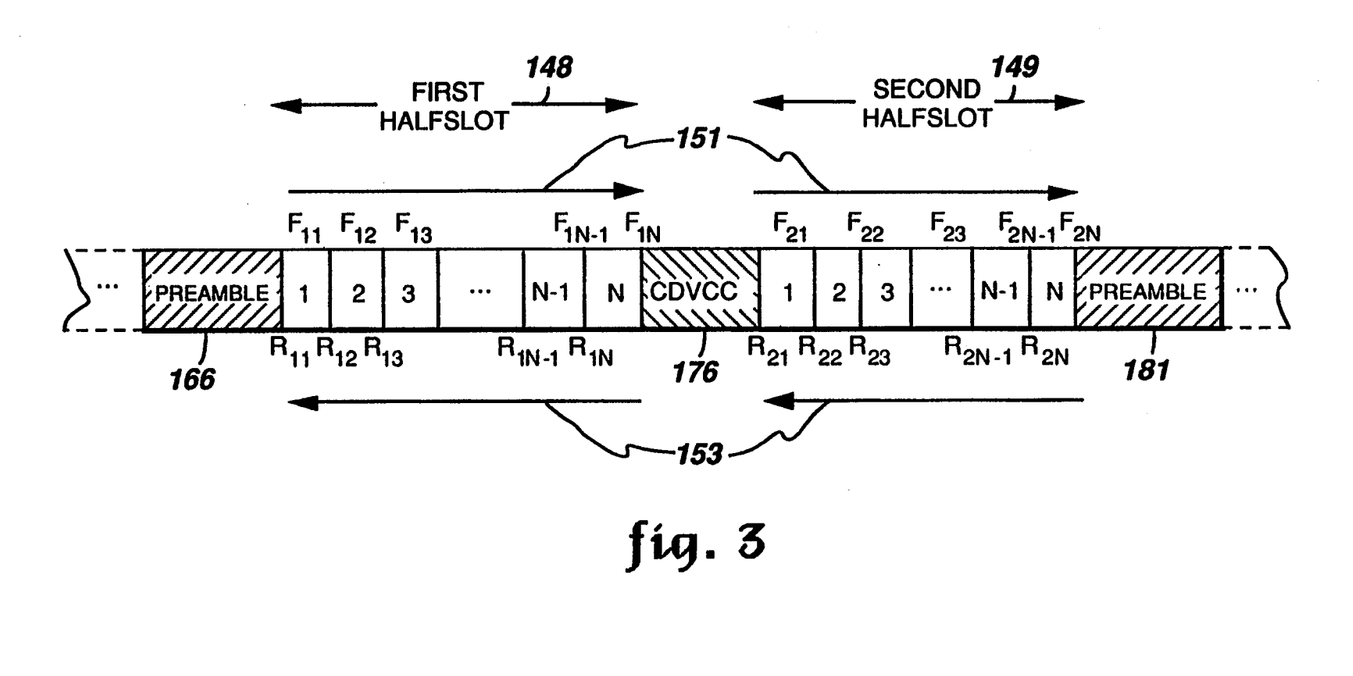
FIG. 3 is an illustration of halfslot and subslot divisions of the slots shown in FIG. 1 and an illustration of forward and reverse demodulation of the subslots.

The frame/slot structure of the U.S. digital cellular system for continuous base to mobile transmission provides the known data sequences, reference symbols, spanning each data slot as shown in FIG. 3, namely, preamble 166 at the beginning of the slot, CDVCC 176 at the middle of the slot, and preamble 181 at the end of the slot which is actually the preamble of the next slot (slot 3 of FIG. 1). The slots of FIG. 1 may each be divided into a first and second halfslot 148, 149 respectively, preferably divided at the CDVCC as shown in FIG. 3. The remaining portion of the halfslots are subdivided into subslots numbered from 1 to N. The size of the subslots is chosen from channel conditions, signal level, antenna type, vehicle speed, carrier frequency, modulation scheme and data rate. The optimal subslot size is chosen to correspond to the average fade duration. This technique of sectioning the slot into subslots for decoding helps isolate a fade within a particular subslot. For instance, in the U.S. digital cellular system, assuming that there is uncorrectable error for a fade corresponding to a signal level of $-20$ dB relative to a reference signal level at 0 dB in a Rayleigh fading channel, when a vertical monopole antenna is used at a carrier frequency of 900 MHz and vehicle speed of 100 Kmph, it can be shown that the average fade duration is approximately 482 microseconds as described in "A Power-Spectral Theory of Propagation in the Mobile-Radio Environment" by M. J. Gans, IEEE Transactions on Vehicular Technology, Vol. VT-21, No. 1, pp. 27-38, February 1972. For a data rate of 48.6 Kbps and $\pi/4$-shifted differentially encoded quadrature phase shift keying (DQPSK) modulation, the above fade duration spans 12 symbols. Hence, the subslot size for the preferred embodiment having the above-mentioned parameters is chosen to be 12 symbols long. (Different subslot lengths may be determined by adjusting the parameters above.)

The order and direction which the subslots are demodulated are determined for each subslot based upon a measure of the SNR of previously demodulated subslots. The process begins with subslot 1 being demodulated in a forward direction, forward sense, with the samples of this subslot least recently received being demodulated before the most recently received samples as indicated by arrows 151. Subslot N is demodulated in a reverse direction, reverse sense, as indicated by arrows 153. Next, a forward metric $F_{11}$ is computed for subslot 1 in the forward direction, and a reverse metric $R_{1N}$ is computed from subslot N, wherein the first subscript index indicates the halfslot and the second represents the subslot being demodulated. Many conventional metrics which indicate the inverse of the SNR may be employed. For example, if an equalizer such as described in the aforementioned publication by D'Avella is used, the path metrics associated with two best survivor states will provide a measure of the inverse SNR. Alternatively, the metric may be chosen as the average noise power over the subslot. This will be provided by the path metric associated with the best survivor state. The reverse metric $R_{xx}$ is completed the same as the forward metric $F_{xx}$ with the exception that the data on which it is calculated is in the reverse order. In the preferred embodiment, the order in which the samples are demodulated is the order in which the metric is calculated, a subslot demodulated in reverse sense has the metric calculated in reverse sense.

The demodulation is then extended to the subslot adjacent the last demodulated subslot having a greater SNR as indicated by the metrics. Since the metrics are inversely proportional to the SNR, and proportional to the noise power, the direction of decoding is chosen based upon the lower of the two metrics. If $F_{11} < R_{1N}$, then subslot 2 is demodulated in the forward sense and $F_{12}$ is obtained. $F_{12}$ is then compared to $R_{1N}$ and once again the decoding is extended in the direction of the better metric. If $F_{11} > R_{1N}$ then subslot $N-1$ is demodulated in the reverse direction. This recursive process continues until the two directions of decoding overlap over one subslot.

After all subslots have been demodulated into digital information, the information is arranged in the original order of the samples from which they were demodulated to produce one continuous stream of digital information for the entire slot. This information is then provided to an output device capable of utilizing the digital information.

Figure 4:
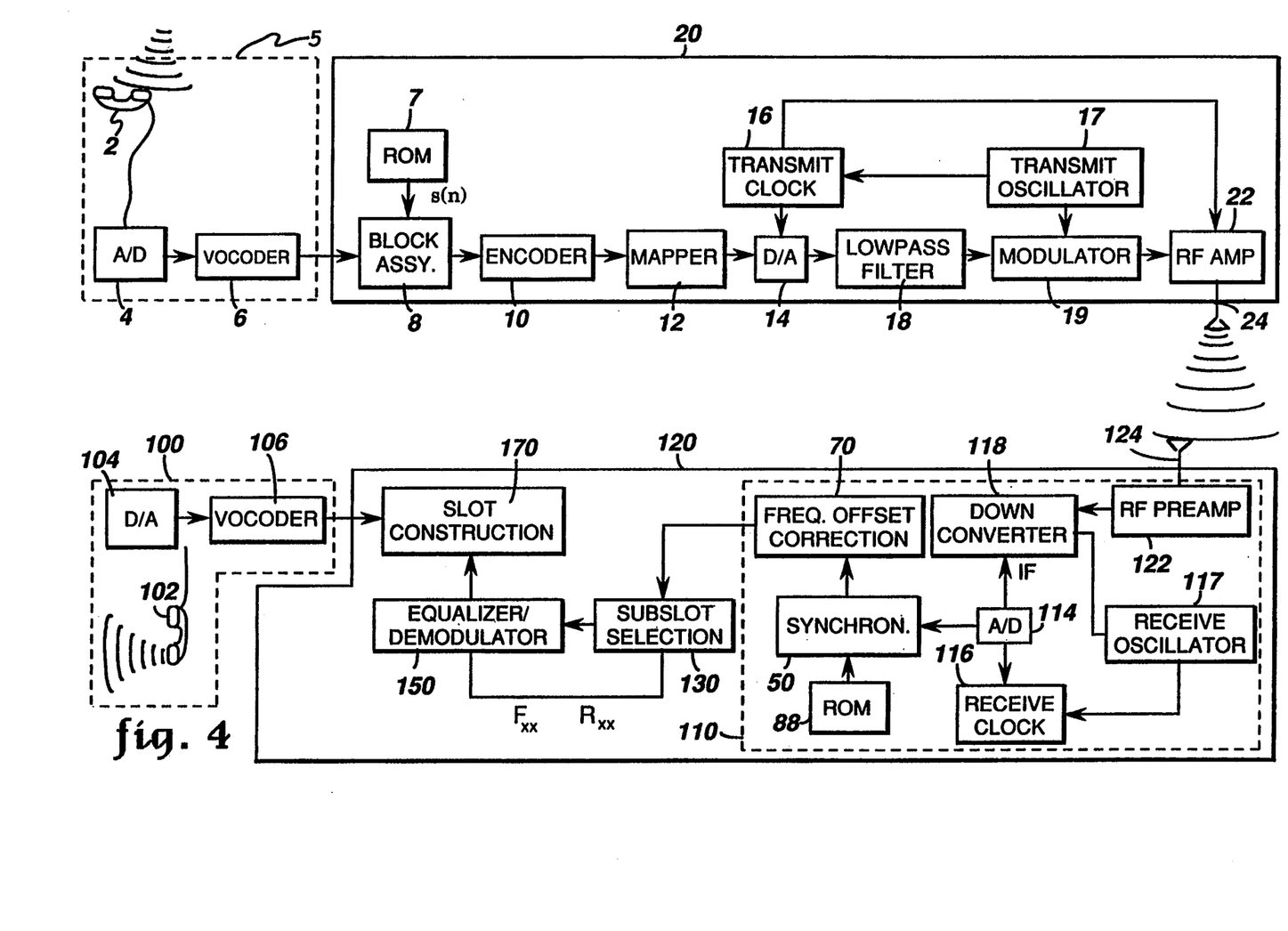
FIG. 4 is simplified block diagram of a digital radio communication system according to the present invention.

FIG. 4 illustrates a block diagram of the present invention showing a digital information source 5, a transmitter 20, a receiver 120 and an output means 100. Digital information from digital information source 5 desired to be transmitted is provided to a block assembly unit 8. The digital information may be digitized speech data from an operator speaking into a handset 2 to create an analog voltage signal that is sampled by analog to digital (A/D) converter 4 and analyzed by a vocoder to provide coded speech data to a block assembly unit 8. Block assembly unit 8 combines digital information, reference symbols and other required data stored in a reference symbol storage means, shown here as a read only memory (ROM) 7, in a slot of data having a standardized format interleaved with other data slots (such as shown in FIG. 1) to be communicated through a TDMA system.

Encoder 10 encodes the slot of data in a desired manner and passes the encoded data to a mapper 12 which maps several bits to a symbol of a predetermined symbol constellation. Mapped symbols are provided to a digital to analog (D/A) converter 14 which converts the mapped samples to an analog signal at a rate governed by a transmit clock 16 and transmit oscillator 17. The analog signal is then filtered by a lowpass filter 18, modulated by modulator 19 and passed to a radio frequency (RF) amplifier 22 which creates an RF signal transmitted through antenna 24.

The transmitted signal is sensed by a receiving antenna 124, passed to RF preamplifier 122 and heterodyned by a down converter 118 to provide an intermediate frequency (IF) signal. An A/D converter 114 in the receiver samples the IF signal at a rate determined by a receive clock 116 and receive oscillator 117, resulting in a plurality of received reference samples and data samples corresponding to samples of reference symbols and data symbols, respectively. The samples are provided to synchronization unit 50, coupled to second reference symbol storage unit shown as ROM 88, adapted for retaining predetermined reference symbols being the same as:

1) the symbols of preamble 166, 181 or CDVCC data 176 shown in FIG. 1, and
2) reference symbols of ROM 7, ROM 88 of FIG. 4.

Synchronization unit 50 analyzes the received reference samples it receives from A/D converter 114 to that of ROM 88 and determines a sample timing b corresponding to a best match. Data samples corresponding to the best sample timing b are passed to a frequency offset correction unit 70. Frequency offset correction unit 70, then determines a frequency offset which represents the phase drift between transmit and receive oscillators 17, 117, respectively, and corrects the data by this offset. An equalizer 90 receives the data, equalizes it and passes the data to a subslot selection unit 130 which buffers the data. (All elements in receiver 120 up until, but not including equalizer 90, collectively may be referred to as synchronization and sampling (S&S) means 110.) The buffered data is sectioned into two halfslots (148, 149 of FIG. 3) each sectioned into subslots numbered subslot 1 through subslot N. The first subslot from the beginning of the halfslot, subslot 1, is provided to a equalizer/demodulator 150 to be demodulated in a forward sense. The first subslot from the end of the halfslot, subslot N, is also provided to equalizer/demodulator 150 to be demodulated in a reverse sense. The demodulated data is provided to a slot construction unit 170 to be stored. A forward metric is determined by equalizer/demodulator 150 for subslots demodulated in a forward sense such as $F_{11}$ pertaining to subslot 1 of first halfslot 148. Equalizer/demodulator 150 also determines a reverse metric for subslots demodulated in a reverse direction such as $R_{1N}$ for subslot N of halfslot 148. The metric is then passed to subslot selection unit 130.

Subslot selection unit 130 then determines if $F_{11}$ indicates a greater SNR than $R_{1N}$ does, and if so, the next subslot from the beginning of halfslot 148, subslot 2, is demodulated by equalizer/demodulator 150 and a forward metric $F_{12}$ is calculated. Slot construction unit 170 receives the demodulated digital information. $F_{12}$ is then compared to the last metric of opposite sense (forward sense vs. reverse sense) being $R_{1N}$. If $R_{1N}$ indicates a greater SNR than $F_{12}$, subslot $R_{1N-1}$ is demodulated in a reverse sense next. Slot construction unit 170 then stores the demodulated information. The process of selecting subslots, demodulating them, storing the demodulated data, determining metrics and extending demodulation to the subslot adjacent the subslot having the lowest metric is repeated until all subslots have been demodulated.

Slot construction unit 170 provides the digital information to an output device 100 capable of utilizing digital information in the proper order and sense (forward or reverse) regardless of the order and sense of demodulation. Output device may be a second vocoder 106 and a second D/A converter 104 and a second handset 102, which convert the digital information into an audible signal at second handset 102.

In a second embodiment of the invention, all elements of FIG. 4 function as in the first embodiment up until frequency offset correction means 70. At this point, subslot selection unit 130 selects subslots 1, 2, 3, ... N passing each sequentially to equalizer/demodulator 150 which demodulates each subslots in a forward sense into digital information and stores the digital information. Equalizer/demodulator 150 then calculates a forward metrics $F_{11}, F_{12}, F_{13}, \ldots F_{1N}$ for subslots 1, 2, 3, ... N, respectively, and stores the forward metrics.

Subslot selection unit 130 then selects subslots N, N−1, N−2, ... 1 passing each sequentially to equalizer/demodulator 150 which demodulates each subslots in a reverse sense into digital information and stores the digital information. Equalizer/demodulator 150 then calculates a reverse metric $R_{1N}, R_{1N-1}, R_{1N-2} \ldots R_{11}$ for subslots N, N−1, N−2, ... 1 respectively, and stores the reverse metrics.

Equalizer/demodulator 150 then computes N+1 slot metrics from the subslot metrics as follows:

$$M_0 = F_{11} + F_{12} + F_{13} + \ldots + F_{1N}$$
$$M_1 = F_{11} + F_{12} + F_{13} + \ldots + F_{1N-1} + R_{1N}$$
$$M_2 = F_{11} + F_{12} + F_{13} + \ldots + F_{1N-2} + R_{1N-1} + R_{1N}$$
$$M_3 = F_{11} + F_{12} + F_{13} + \ldots + F_{1N-3} + R_{1N-2} + R_{1N-1} + R_{1N}$$
$$\vdots$$
$$M_{N-1} = F_{11} + R_{12} + R_{13} + \ldots + R_{1N}$$
$$M_N = R_{11} + R_{12} + R_{13} + \ldots + R_{1N}$$

The first slot metric, $M_0$ pertains to all subslots demodulated in a forward sense. The second, $M_1$ pertains to all but the last slot demodulated in a forward sense with the last subslot being demodulated in a reverse sense. This pattern continues until the last slot metric $M_N$ pertains to all subslots being demodulated in a reverse sense. A best slot metric indicating the largest SNR determines the sense of the demodulated digital information for each subslot. This information is sent from equalizer/demodulator 150 to slot construction means 170 to determine the correct sense of demodulation and arrangement of the subslots. For example, if $M_3$ is the best metric (here a smallest value since the metric is the inverse of the SNR), equalizer/demodulator 150 would select the forward sense digital information for subslots 1, 2, 3, ... N−3, and reverse sense digital information for subslots N−2, N−1 and N. The digital information for subslots N−2, N−1 and N is passed to, and rearranged into the proper order by slot construction unit 170. This digital information is then passed to an output device capable of utilizing the digital information.

An advantage of the present invention over conventional single sided decoding is that it can isolate a subslot with a poor SNR and can demodulate the samples up to this subslot from both directions, without significant loss of data.

A second advantage of this method is that it mitigates the effect of non-minimum phase in a multipath channel. This condition simply means that a reflected path is stronger than the direct path. By decoding in the reverse direction the reflected path appears as the direct path and results in a minimum phase condition which is the desired situation for decoding.

It may be noted that the present invention may also be employed with any other TDMA system that have similar slot/frame structure to that described above. However, the present invention, by being more robust and fade resistant, does not require a great degree a complex channel impulse response estimation and tracking algorithm to be used in conjunction with the equalizer, and for this reason is of particular significance to realization of a low complexity mobile radio equalizer for the U.S. digital cellular systems.

The decoding scheme is also not restricted to equalizers and π/4-Shifted-DQPSK modulation but may be employed with other decoders such as sequential trellis decoders described in "Sequential Coding Algorithms: A Survey and Cost Analysis" by John B. Anderson and Seshadri Mohan; and MLSE type decoders (D'Avella id.). It is also a variation of this invention to demodulate the entire slot by subslots and omit the intermediate halfslot division.

While several presently preferred embodiments of the invention have been described in detail herein, many modifications and variations will now become apparent to those skilled in the art. It is, therefore, to be understood that the appended claims are intended to cover all such modifications and variations as fall within the true spirit of the invention.

What we claim is:

1. A fade-resistant method of communicating digital information comprising the steps of:
   a) transmitting encoded digital information in a radio-frequency (RF) signal;
   b) receiving the RF signal;
   c) sampling the RF signal to provide a halfslot of samples from least recent to most recent samples;
   d) dividing the halfslot of samples into a plurality of subslots numbered 1 to N from least recent to most recent, respectively;
   e) demodulating subslot 1 into digital information in a forward direction;
   f) calculating a forward metric indicating an inverse of the signal-to-noise (SNR) ratio of subslot 1;
   g) demodulating subslot N into digital information in a reverse direction;
   h) calculating a reverse metric indicating an inverse of an SNR of subslot N;
   i) determining if the reverse metric last calculated indicates a larger SNR than the forward metric last calculated and
      1. demodulating a most recent subslot which has not yet been demodulated in a reverse direction into digital information, and calculating a reverse metric for this subslot if the reverse metric last calculated indicates a larger SNR than the forward metric last calculated, otherwise:
      2. demodulating a least recent subslot which has not yet been demodulated in a forward direction into digital information, and calculating a forward metric for the subslot;
   j) storing the digital information until all subslots have been demodulated;
   k) repeating steps i-j until the N subslots have been demodulated; and
   l) providing the digital information in the same order and direction as the samples from which they were demodulated to an output device capable of utilizing the digital information.

2. A fade-resistant method of communicating digital information comprising the steps of:
   a) transmitting encoded digital information in a radio-frequency (RF) signal;
   b) receiving the RF signal;
   c) sampling the RF signal to provide a halfslot of samples from least recent to most recent samples;
   d) dividing the halfslot of samples into a plurality of subslots numbered 1 to N from least recent to most recent, respectively;
   e) demodulating each subslot from the beginning of the halfslot in a forward direction into forward sense digital information;
   f) calculating a forward subslot metric $F_{ij}$ (j=1, 2, 3, ... N) for each demodulated subslots 1, 2, 3, ... N with subscript i indicating the halfslot, $F_{ij}$ indicating an inverse of a signal-to-noise ratio (SNR) of each subslot;
   g) storing subslot metrics $F_{ij}$ and the forward sense digital information for each subslot;
   h) demodulating each subslot from the end of the halfslot in a reverse direction into reverse sense digital information;
   i) calculating a reverse subslot metric $R_{ij}$ (j=N, N−1, N−2 ... 1) for subslots N−1, N−2, N−3, ... 1 with subscript i indicating the halfslot, $R_{ij}$ indicating an inverse of a SNR of the subslot;
   j) storing the reverse subslot metrics $R_{ij}$ and the reverse sense digital information for each subslot;
   k) determining a plurality of halfslot metrics $M_k$ (k=0,1,2,3, ... N) each being the sum of a subslot metric for all subslots;
   l) determining $M_k$ having a lowest value being a best halfslot metric $M_b$ indicating the sense of demodulation for each subslot;
   m) selecting digital information for all subslots of the sense indicated by best halfslot metric $M_b$; and
   n) providing the digital information in the same order and direction as the samples from which they were demodulated to an output device capable of utilizing the digital information.

3. The fade-resistant method of communicating digital information of claim 2 wherein the halfslot metrics are calculated according to:

$$M_0 = F_{11} + F_{12} + F_{13} + \ldots + F_{1N}$$
$$M_1 = F_{11} + F_{12} + F_{13} + \ldots + F_{1N-1} = R_{1N}$$
$$M_2 = F_{11} + F_{12} + F_{13} + \ldots + F_{1N-2} + R_{1N-1} + R_N$$
$$\vdots$$
$$M_{N-1} = F_{11} + R_{12} + R_{13} + \ldots + R_{1N}$$
$$M_N = R_{11} + R_{12} + R_{13} + \ldots + R_{1N}$$

where $M_0$ indicates all subslots demodulated in a forward direction, $M_N$ indicates all subslots demodulated in a reverse direction, and the remaining halfslot metrics indicating subslots demodulated partly in a forward direction and partly in a reverse direction.

4. A fade-resistant method of communicating digital information comprising the steps of:
   a) transmitting encoded digital information in a radio-frequency (RF) signal;
   b) receiving the RF signal;
   c) sampling the RF signal to provide a slot of samples from least recent to most recent samples;
   d) dividing the slot of samples into a plurality of subslots numbered 1 to N from least recent to most recent, respectively;
   e) demodulating subslot 1 into digital information in a forward direction;
   f) calculating a forward metric indicating an inverse of a signal-to-noise (SNR) ratio of subslot 1;
   g) demodulating subslot N into digital information in a reverse direction;

h) calculating a reverse metric indicating an inverse of a SNR of subslot N;
i) determining if the reverse metric last calculated indicates a larger SNR than the forward metric last calculated and
   1. demodulating a most recent subslot which has not yet been demodulated in a reverse direction into digital information, and calculating a reverse metric for this subslot if the reverse metric last calculated indicates a larger SNR than the forward metric last calculated, otherwise:
   2. demodulating a least recent subslot which has not yet been demodulated in a forward direction into digital information, and calculating a forward metric for the subslot;
j) storing the digital information until all subslots have been demodulated;
k) repeating steps i-j until the N subslots have been demodulated; and
l) providing the digital information in the same order and direction as the samples from which they were demodulated to an output device capable of utilizing the digital information.

5. A simplified fade-resistant digital communications system comprising:
   a) a digital information source adapted for providing a stream of digital information;
   b) a transmitter adapted for encoding and transmitting the digital information from the digital information source in a radio-frequency (RF) signal;
   c) a receiver adapted for sampling the transmitted RF signal into a block of data having plurality of samples divided into subslots arranged from a first subslot at a beginning of the data block to a last subslot at the end of the data block, the receiver adapted for demodulating the first subslot in a forward direction and the last subslot in a reverse direction into digital information, determining the digital information having a stronger signal and demodulating a next subslot measured from the beginning of the datablock that has not yet been demodulated, in the forward direction if the digital information of the last demodulated subslot from the beginning of the datablock indicates a stronger signal than demodulated from the end of the datablock, else demodulating a next subslot measured from the end of the datablock that has not yet been demodulated in the reverse direction; and continuing until all subslots have been demodulated; and
   d) an output means adapted for receiving the digital information from the receiver utilizing the digital information from the receiver.

6. The simplified fade-resistant digital communications system as recited in claim 5 wherein the receiver comprises:
   a) synchronization and sampling (S&S) means adapted for providing synchronized samples of the transmitted RF signal;
   b) equalizer/demodulator means responsive to the subslot selection means, adapted for equalizing the synchronized samples from the S&S means and demodulating samples in a forward direction or a reverse direction into digital information and adapted for determining a forward metric for samples demodulated in a forward direction and a reverse metric for samples demodulated in a reverse direction, the metrics indicating a measure of the inverse of the signal-to-noise ratio (SNR);
   c) subslot selection means adapted for receiving the metrics calculated by the equalizer/demodulation means, buffering the synchronized samples, dividing the synchronized samples into a plurality of subslots arranged from a first subslot at the beginning of the synchronized samples to a last subslot at the end of the synchronized samples,
   1. selecting a next subslot closest to the beginning of the synchronized samples which has not yet been demodulated and providing it to the demodulator in a forward direction for demodulating if the last metric calculated in a forward direction indicates a greater signal strength than the last metric calculated in a reverse direction, and causing the metric calculation means to calculate a forward metric for this subslot,
   2. else selecting a next subslot closest to the end of the synchronized samples which has not yet been demodulated and providing it to the demodulator in a reverse sense for demodulating if the last metric calculated in a forward direction does not indicate a greater signal strength than the last metric calculated in a reverse direction, and causing the metric calculation means to calculate a reverse metric for this subslot; and
   d) subslot construction means adapted for receiving and buffering the demodulated digital information from the equalizer/demodulation means until the entire halfslot has been demodulated, and providing the digital information in the same order and direction as the synchronized samples from which the digital information was demodulated.

7. The simplified fade-resistant digital communications system as recited in claim 5 wherein the receiver comprises:
   a) synchronization and sampling (S&S) means adapted for providing synchronized samples of the transmitted RF signal;
   b) subslot selection means adapted for buffering the synchronized samples, dividing the synchronized samples into a plurality of subslots and providing all subslots to the demodulator once in a forward direction and once in a reverse direction for demodulating;
   c) equalizer/demodulator means responsive to the subslot selection means, adapted for:
   1. equalizing the subslots of synchronized samples from the subslot selection means,
   2. demodulating each subslot into forward direction digital information and determining a forward metric for subslots received in a forward direction,
   3. demodulating each subslot into reverse direction digital information and determining a reverse metric for subslots received in a reverse direction,
   4. calculating halfslot metrics each being a sum of a metric for each subslot,
   5. determining a best halfslot metric indicating the sense of demodulation for each subslot, and
   6. selecting digital information of the sense indicated by the best halfslot metric;
   d) subslot construction means adapted for:
   1. receiving the digital information for each subslot in the direction corresponding to the best halfslot metric from the equalizer/demodulator, and
   2. providing the digital information in the same order and direction as the synchronized samples from which the digital information was demodulated.

* * * * *